(12) United States Patent
Suzuki et al.

(10) Patent No.: US 7,712,395 B2
(45) Date of Patent: May 11, 2010

(54) AUTOMATIC TRANSMISSION

(75) Inventors: Fuminori Suzuki, Okazaki (JP); Hitoshi Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 1274 days.

(21) Appl. No.: 11/225,202

(22) Filed: Sep. 14, 2005

(65) Prior Publication Data
US 2006/0075847 A1 Apr. 13, 2006

(30) Foreign Application Priority Data
Sep. 29, 2004 (JP) ............................. 2004-284375

(51) Int. Cl.
*F16H 57/02* (2006.01)
(52) U.S. Cl. ...................... 74/606 R; 439/34; 361/707; 318/551
(58) Field of Classification Search ............... 74/606 R; 475/76, 123, 127; 439/34; 361/707
See application file for complete search history.

(56) References Cited

U.S. PATENT DOCUMENTS

| | | | |
|---|---|---|---|
| 4,805,490 A * | 2/1989 | Fuehrer et al. ............. | 74/606 R |
| 5,361,650 A * | 11/1994 | Klecker et al. ............. | 74/606 R |
| 5,709,134 A * | 1/1998 | Ulm .......................... | 74/606 R |
| 5,749,060 A * | 5/1998 | Graf et al. ................... | 340/439 |
| 5,811,747 A | 9/1998 | Taniguchi et al. | |
| 5,823,070 A | 10/1998 | Taniguchi et al. | |
| 6,164,160 A * | 12/2000 | Nassar ..................... | 74/606 R |
| 6,205,887 B1 | 3/2001 | Barnreiter et al. | |
| 6,307,749 B1 * | 10/2001 | Daanen et al. .............. | 361/704 |
| 6,393,943 B1 * | 5/2002 | Sommer et al. ........... | 74/606 R |
| 6,530,856 B1 * | 3/2003 | Kakiage ..................... | 475/123 |
| 6,612,202 B2 * | 9/2003 | Thorum et al. ............. | 74/606 R |
| 7,375,966 B2 * | 5/2008 | Murakami et al. .......... | 361/707 |
| 2002/0088304 A1* | 7/2002 | Thorum et al. ............ | 74/606 R |
| 2003/0167877 A1 | 9/2003 | Yamane et al. | |

* cited by examiner

*Primary Examiner*—Richard W Ridley
*Assistant Examiner*—Thomas Diaz
(74) *Attorney, Agent, or Firm*—Nixon & Vanderhye PC

(57) ABSTRACT

An automatic transmission includes a pressure adjusting unit that controls hydraulic pressure supplied to a transmission mechanism by the operation of a solenoid valve. A housing has a heat radiating portion for radiating heat to the outside and houses the pressure adjusting unit. A first connector is so arranged as to pass through the housing and has a control circuit unit electrically connected to the solenoid valve of the pressure adjusting unit. A second connector is electrically connected to an engine control unit outside the housing and engages with the first connector and the heat radiating portion. The second connector is electrically connected to the control circuit unit and presses the first connector onto the heat radiating portion.

9 Claims, 5 Drawing Sheets

AUTOMATIC TRANSMISSION

CROSS-REFERENCE TO RELATED APPLICATION

This application is based on Japanese Patent Application No. 2004-284375 filed on Sep. 29, 2004, the disclosure of which is incorporated herein by reference.

FIELD OF THE INVENTION

The present invention relates to an automatic transmission.

BACKGROUND OF THE INVENTION

Conventionally, in an automatic transmission of the type in which a transmission mechanism for varying speeds stepwise or continuously variably is driven by hydraulic pressure. The hydraulic pressure supplied to the transmission mechanism is adjusted by a pressure adjusting unit controlled by a control circuit unit.

U.S. Pat. No. 5,823,070 shows an automatic transmission in which a connector case is arranged in such a way as to pass through a housing for housing a pressure adjusting unit and a control circuit unit connected to the electric components of the pressure adjusting unit is accommodated in the connector case. In the automatic transmission of this type, it is possible to realize, for example, a speed change responsive to the driving state of a vehicle by electrically connecting the control circuit unit housed in the connector case to another control circuit unit outside the housing and the electric components such as a sensor.

However, in a conventional automatic transmission in which a control circuit unit is housed in a connector case, a structure that releases heat generated by the control circuit unit itself to the outside is not employed for a connector and hence the malfunction of the control circuit unit is apt to occur. The malfunction of the control circuit unit finally causes the transmission error of the automatic transmission and hence it is extremely important to accelerate heat radiation from the control circuit unit. A method of expanding the area of the circuit board of the control circuit unit is thought as a method of accelerating heat radiation from the control circuit unit, but in the case of this method, the size of a connector is increased to increase costs, which is not desirable.

SUMMARY OF THE INVENTION

The object of the present invention is to provide an automatic transmission that prevents a transmission error and reduces costs.

According to the present invention, a first connector that is so arranged as to pass through a housing has a control circuit unit electrically connected to an electric component of the pressure adjusting unit housed in the housing and is pressed onto the heat radiating portion of the housing. With this, heat generated in the control circuit unit is conducted to the heat radiating portion and is dissipated to the outside of the housing and hence a malfunction and a transmission error are prevented. Moreover, according to the invention, a second connector that is electrically connected to an electric component outside the housing engages with the first connector and the heat radiating portion, thereby being electrically connected to the control circuit unit and pressing the first connector onto the heat radiating portion. That is, the second connector that electrically connects the electric component outside the housing to the control circuit unit engages with the first connector and the heat radiating portion to serve also as the function of pressing the first connector onto the heat radiating portion, which results in reducing costs.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF THE PREFERRED EMBODIMENTS

Hereinafter, a plurality of preferred embodiments of the invention will be described on the basis of the drawings.

First Embodiment

Figure 2A:
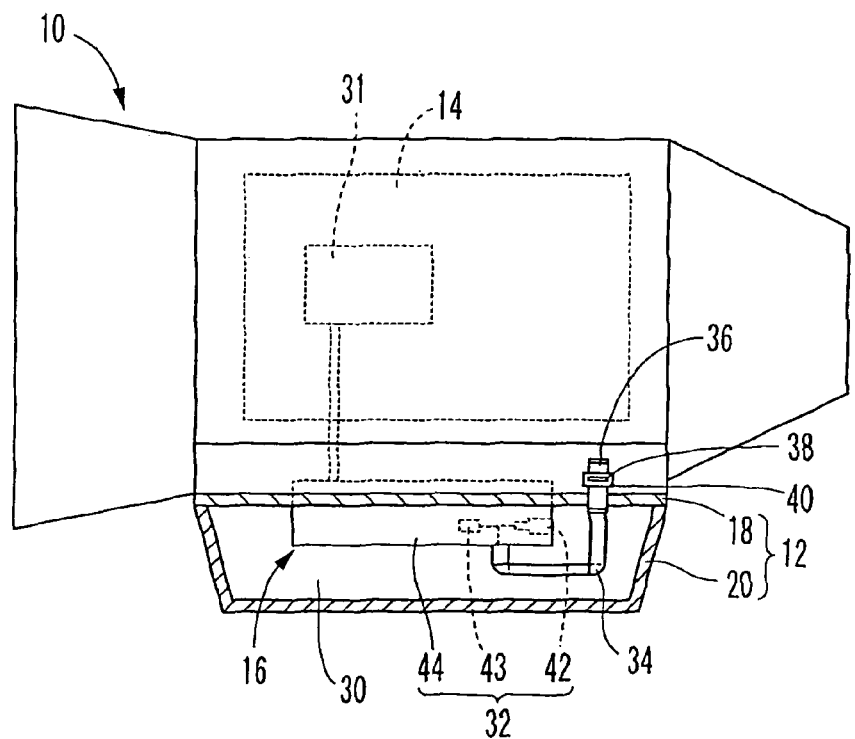
FIG. 2A is a front view, partly in cross section, showing the automatic transmission in accordance with the first embodiment
Figure 2B:
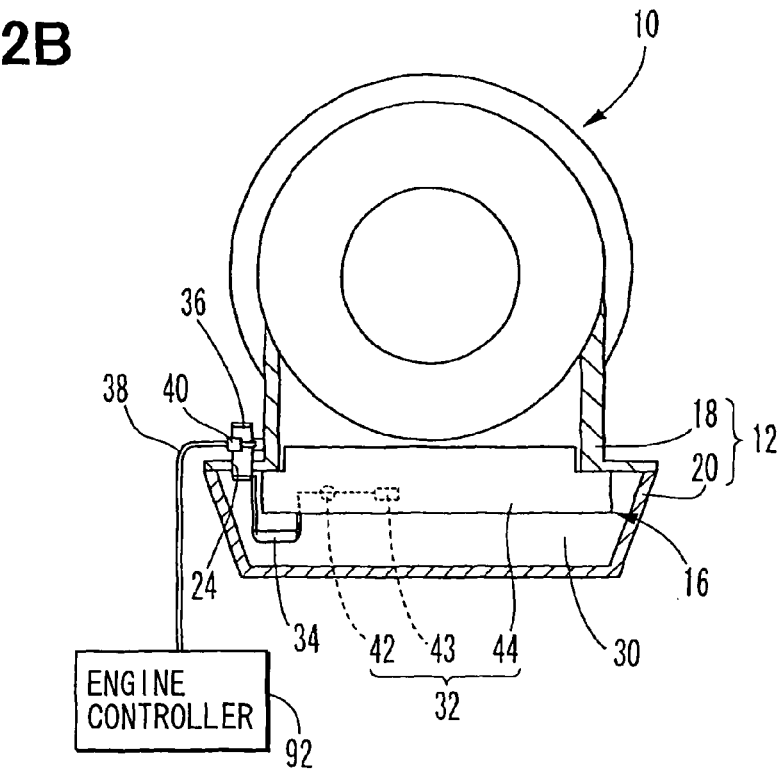
FIG. 2B is a side view, partly in cross section, showing the automatic transmission in accordance with the first embodiment.

FIGS. 2A and 2B show an automatic transmission 10 in accordance with the first embodiment of the present invention. The automatic transmission 10 is a so-called electronically controlled automatic transmission provided with a housing 12, a transmission mechanism 14, and a hydraulic pressure control module 16 and is mounted for use on a vehicle.

The housing 12 is constructed of a combination of a transmission case 18 and an oil pan 20.

Figure 3:
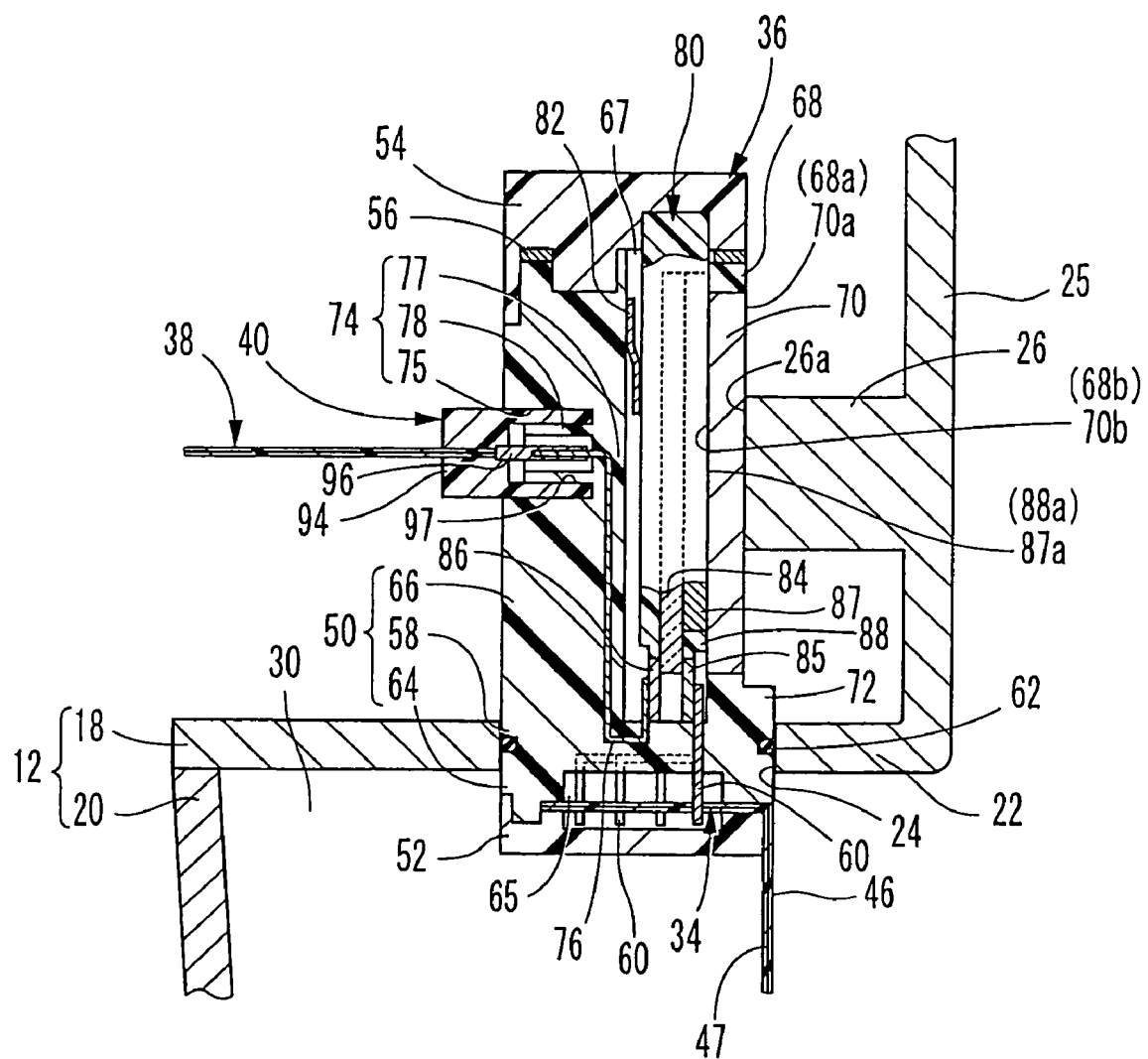
FIG. 3 is a sectional view taken on a line III-III in FIG. 1.

The transmission case 18 is formed of metal such as Al in a hollow shape and houses a transmission mechanism 14 in it. As shown in FIGS. 2A, 2B, and FIG. 3, a flange portion 22 for mounting the oil pan 20 is formed at the bottom end of the transmission case 18. A through hole 24 passing through the flange portion 22 in the direction of thickness (that is, in the up and down direction in this case) is formed in a cylindrical shape in the transmission case 18. A side wall portion 25 provided on the periphery of the through hole 24 in the transmission case 18 is nearly vertical to the flange portion 22 and a heat radiating portion 26 is formed integrally with the side wall portion 25. This heat radiating portion 26 is formed in the shape of a solid rectangular block protruding in a direction nearly orthogonal to the axis O of the through hole 24 from the external wall surface 25$a$ of the side wall portion 25 and has a protruding end surface 26$a$ formed in the shape of a flat surface. The heat radiating portion 26 receives heat from a first connector 36, which abuts against the protruding end surface 26a and will be described later, and dissipates the heat to the atmosphere outside the transmission case 18 (housing 12).

The oil pan 20 is formed of metal in the shape of a plate and is mounted on the flange portion 22 with its opening faced upward. A top end around the opening of the oil pan 20 is in close contact with the whole of the flange portion 22 in the peripheral direction. A space 30 that is surrounded by the oil pan 20 and the flange portion 22 and stores working oil is formed as the internal space of the housing 12, and the bottom end of the through hole 24 communicates with the space 30.

The transmission mechanism 14 operates a specified number of moving elements 31 according to hydraulic pressure supplied from the hydraulic pressure control module 16 to vary the transmission gear ratio of a vehicle. This transmission mechanism 14 may vary the transmission gear ratio stepwise or may vary the transmission gear ratio continuously variably. The transmission mechanism 14 that varies the transmission gear ratio stepwise refers to a transmission mechanism in which friction elements as the moving elements 31 are engaged with or disengaged form each other according to the pressure of the supplied oil. On the other hand, the transmission mechanism 14 that varies the transmission gear ratio continuously variably refers to a transmission mechanism in which the diameter of a belt wound around a pulley as the moving element 31 is varied according to the pressure of the supplied oil or a transmission mechanism in which a trunnion for supporting a power roller sandwiched between input and output discs is provided as the moving element 31 and in which the angle of inclination of the power roller is varied according to the pressure of the supplied oil.

The hydraulic pressure control module 16 controls hydraulic pressure supplied to the moving elements 31 that drive the transmission mechanism 14. The hydraulic pressure control module 16 is constructed of a pressure adjusting unit 32, an internal cable 34, a first connector 36, an external cable 38, a second connector 40, and the like.

The pressure adjusting unit 32 is fixed to the bottom surface of the flange portion 22 and is housed in the oil pan 20, that is, in the internal space 30 of the housing 12. The pressure adjusting unit 32 has a specified number of solenoid valves 42 and a pressure sensor 43, and a body 44 that houses these solenoid valves 42, the pressure sensor 43, and the like and forms an oil passage. Working oil sucked from the oil pan 20 by an oil pump (not shown) is supplied to the oil passage formed by the body 44. The solenoid valve 42 directly controls, by the use of this working oil, the hydraulic pressure supplied to a corresponding moving element 31 or provides a pressure control valve (not shown) with a command pressure to indirectly control the hydraulic pressure supplied to the corresponding moving element 31, to thereby drive the transmission mechanism 14. At this time, the solenoid valve 42 controls the hydraulic pressure supplied to the moving element 31 according to a command signal which will be described later. Moreover, at this time, the pressure sensor 43 detects the hydraulic pressure supplied to the corresponding moving element 31 and outputs a pressure sensing signal expressing the detection result.

The internal cable 34 is a flexible cable made of a signal wire 47 wrapped by a base material 46 formed of resin in the shape of a belt. The width of the internal cable 34 is made not larger than the inside diameter of the through hole 24. The one end of the internal cable 34 is fixed to the body 44 of the pressure adjusting unit 32 and the signal wire 47 of the internal cable 34 is electrically connected to the solenoid valves 42 and the pressure sensor 43 in the body 44.

Figure 1:
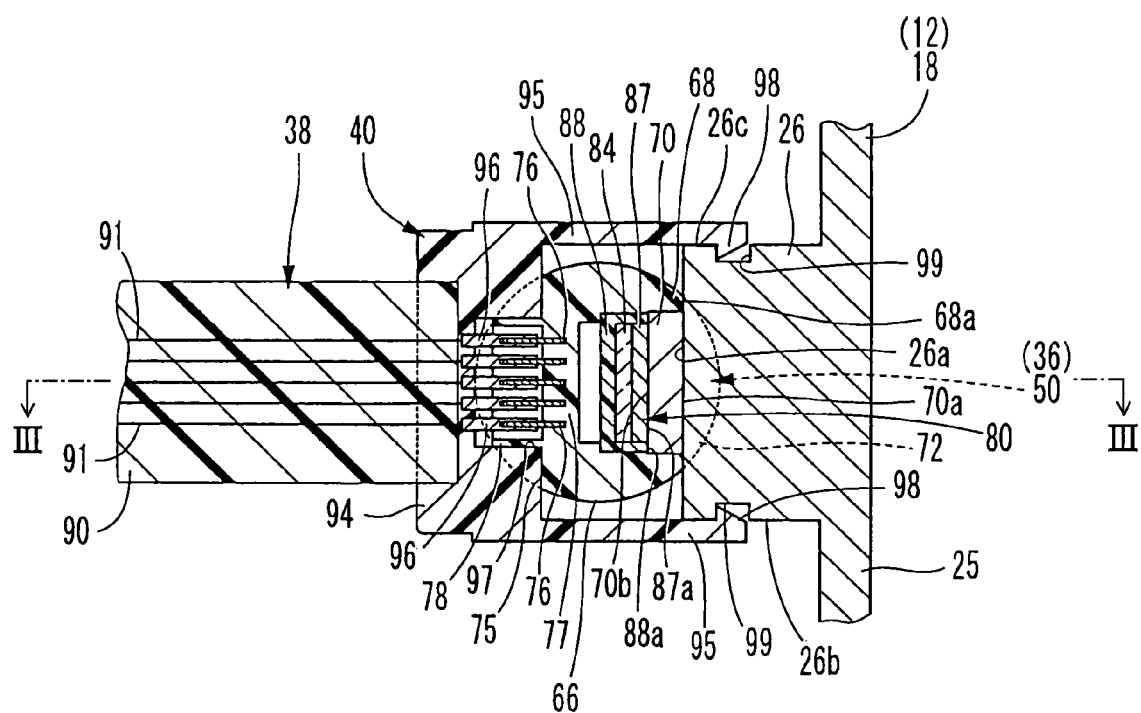
FIG. 1 is a sectional view showing the main portion of an automatic transmission in accordance with the first embodiment.

As shown in FIG. 1 and FIG. 3, the first connector 36 has a connector body 50, an internal cap 52, and an external cap 54, and a gasket 56. The maximum diameter of these elements 50, 52, 54, and 56 is made not larger than the inside diameter of the through hole 24 and the whole first connector 36 can pass through the through hole 24.

The connector body 50 is formed of resin in a hollow shape and is arranged near the side wall portion 25 in such a way as to pass through the through hole 24.

Internal connection terminals 60 are embedded in a cylindrical housing portion 58 housed in the through hole 24 in the connector body 50. The housing portion 58 is fitted in the through hole 24 via an O ring 62, whereby the interface between the housing portion 58 and the through hole 24 is sealed.

In the connector body 50, a portion 64 adjacent to the housing portion 58 and protruding further into the housing 12 than the through hole 24 forms an internal exposed portion exposed to the internal space 30 of the housing 12. This internal exposed portion 64 is formed in the shape of a cylinder which is closed at one end and whose opening 65 faces down and has the internal connection terminals 60 are protruded into the internal exposed portion 64 from the bottom thereof. The internal cap 52 made of resin and closing the opening 65 is fitted on the bottom end of the internal exposed portion 64. These internal exposed portion 64 and internal cap 52 sandwich an end portion opposite to the pressure adjusting unit 32 of the internal cable 34. With this, the internal cap 52 is exposed to the internal space 30 of the housing 12 and removably holds the internal cable 34 between itself and the internal exposed portion 64, and the signal wire 47 of the internal cable 34 is connected to the internal connection terminals 60. The internal cable 34 of the present embodiment has flexibility and the width not larger than the inside diameter of the through hole 24, as described above, and hence can pass through the through hole 24 in a state where it is sandwiched between the internal exposed portion 64 and the internal cap 52.

In the connector body 50, a portion 66 that is adjacent to the housing portion 58 and protrudes further outside the housing 12 than the through hole 24 forms an external exposed portion exposed outside the housing 12. This external exposed portion 66 is formed in the shape of a cylinder which is closed at one end and whose opening 67 faces upward and the internal connection terminals 60 protrude into the external exposed portion 66 from the bottom thereof. The external cap 54 made of resin and closing the opening 67 is fitted on the top end of the external exposed portion 66, and the gasket 56 is sandwiched between these external exposed portion 66 and external cap 54. This prevents the gasket 56 from being exposed outside the housing 12 and hence liquid such as moisture from entering from the opening 67 into the external exposed portion 66.

An abutting portion 68 abutting against the heat radiating portion 26 in the external exposed portion 66 is formed in the shape of a flat plate extending a specified length from the top end surface of the external exposed portion 66 to the through hole 24 and is formed in the shape depressed further inward in the radial direction than the other portion. In this abutting portion 68 is embedded a heat conducting part 70 formed of metal such as Al in the shape of a flat plate. Here, the external wall surface 68a of the abutting portion 68 including the external wall surface 70a of the heat conducting part 70 is formed in a nearly flush flat surface, and the protruding end surface of the heat radiating portion 26 is in surface contact with the external wall surface 68a in such a way as to conduct heat. Moreover, the external wall surface 68b of the abutting portion 68 including the internal wall surface 70b of the heat conducting part 70 is formed in a nearly flush flat surface.

A portion 72 that is adjacent to the through hole 24 side of the abutting portion 68 in the external exposed portion 66 forms a projecting portion projecting further to the side wall portion 25 than the abutting portion 68.

A mounting portion 74 having the second connector 40 mounted thereon in the external exposed portion 66 is opposed to the abutting portion 68 and the projecting portion 72 in the radial direction. In this mounting portion 74 are formed a depressed portion 75 that is open in an outer peripheral surface and is depressed inward in the radial direction, an embedding portion 77 which is formed on the bottom side of the depressed portion 75 and in which the external connection terminals 76 are embedded, and a cylindrical portion 78 which protrudes into the depressed portion 75 and into which the external connection terminals 76 are protruded. The external connection terminals 76 in the present embodiment are embedded also in the housing portion 58 adjacent to the through hole 24 side of the embedded portion 77 and protrudes from the bottom side of the external exposed portion 66 into the external exposed portion 66.

As shown in FIG. 3, the first connector 36 further has a control circuit unit 80 and an urging part 82.

The control circuit unit 80 is housed in the external exposed portion 66 and is covered with the external exposed portion 66 and the external cap 54. This control circuit unit 80 is a chip type so-called electronic control unit in which a circuit board 84 having a plurality of circuit devices mounted thereon is sealed with resin. In the control circuit unit 80 of the present embodiment, internal input/output terminals 85, external input/output terminals 86, and a heat radiating plate 87, which are made of metal, are embedded in a resin part 88 covering the circuit board 84. Here, the internal input/output terminals 85 are exposed from the external wall surface 88a of the resin part 88 and are in contact with the internal connection terminals 60 in such a way to be electrically conductive. Moreover, the external input/output terminals 86 are exposed from the external wall surface 88a of the resin part 88 and are in contact with the external connection terminals 76 in such a way to be electrically conductive. Furthermore, the heat radiating plate 87 has a flat surface 87a exposed from the external wall surface 88a of the resin part 88, and the flat surface 87a is in surface contact with internal wall surface 70b of the heat conducting part 70 in such a way as to be able to conduct heat.

The urging part 82 is a plate spring made of metal and is housed in the external exposed portion 66 along with the control circuit unit 80. The urging part 82 is interposed between the control circuit unit 80 and the mounting portion 74 and urges the control circuit unit 80 to the heat conducting part 70 by its restoring force. With this, the heat radiating plate 87 of the control circuit unit 80 is pressed onto the heat conducting part 70.

As shown in FIG. 1 and FIG. 3, the external cable 38 is a flexible cable made of metal signal wires 91 wrapped by a base material 90 formed of resin in the shape of a belt, as is the case with the internal cable 34. As shown in FIGS. 2A and 2B, one end of the external cable 38 is fixed to an engine control unit 92 provided outside the housing 12 and the signal wires 91 of the external cable 38 are electrically connected to the input/output terminals of the engine control unit 92. Here, the engine control unit 92 is an electronic control unit for controlling the engine and the like of a vehicle and controls the engine and the like on the basis of various kinds of sensor signals.

As shown in FIG. 1 and FIG. 3, the second connector 40 is formed of resin and has a main portion 94 and arm portions 95 that are mounted in the state of engagement (that is, mounted by the use of engagement) on the mounting portion 74 and the heat radiating portion 26, respectively.

The main portion 94 is formed in the shape of a rectangular block fitted in the depressed portion 75 of the mounting portion 74. In the main portion 94 are embedded an end portion opposite to the engine control unit 92 of the external cable 38 and intermediate connection terminals 96 electrically connected to the end portion. Moreover, in the main portion 94 is formed a depressed portion 97 that is open on the opposite side of the external cable 38 and is externally fitted on the cylindrical portion 78 of the mounting portion 74. The intermediate connection terminals 96 protrude into this depressed portion 97 from the bottom thereof and are in contact with the external connection terminals 76 in the cylindrical portion 78 in such a way as to be electrically conductive. With this, the second connector 40 is electrically connected to the engine control unit 92 through the external cable 38.

The arm portions 95 are provided, one to one side, on both sides sandwiching the depressed portion 97 of the main portion 94 and are further extended to the external exposed portion 66 than the main portion 94. The respective arm portions 95 are extended nearly in parallel in such a way as to sandwich the external exposed portion 66 in the radial direction and are respectively engaged with both side surfaces 26b, 26c of the heat radiating portion 26 at the extending end portions. With this, the second connector 40 is secured to the heat radiating portion 26, whereby the external exposed portion 66 is sandwiched between and fixed to the heat radiating portion 26 and the main portion 94. Here, the heat radiating portion 26 and the main portion 94 sandwich the external exposed portion 66 in a direction nearly orthogonal to the axis of the through hole 24. In the present embodiment, the respective arm portions 95 have claws 98 at their extending end portions and the respective claws 98 are engaged with the depressed portions 99 formed in the respective side surfaces 26b, 26c of the heat radiating portion 26 to thereby prevent the second connector 40 from being removed from the heat radiating portion 26.

With the above construction, in the automatic transmission 10, a signal can be sent and received between the solenoid valves 42 and the pressure sensor 43 of the pressure adjusting unit 32 and between the engine control unit 92 and the control circuit unit 80. In the automatic transmission 10 like this, the control circuit unit 80 receives a control signal and various kinds of sensor signals of the vehicle from the engine control unit 92 and a pressure sensor signal from the pressure sensor 43 and produces a command signal to the solenoid valve 42 on the basis of these received signals. The solenoid valve 42 receives the command signal produced in this manner from the control circuit unit 80 and operates so as to cause the pressure supplied to the moving elements 31 to follow the command signal. Therefore, in the present embodiment, the operation of the moving elements 31 and by extension the operation of the whole transmission mechanism 14 follow the command signal of the control circuit unit 80.

Next, the operation test process and the final assembly process of the automatic transmission 10 will be described.

In the operation test process, first, there are prepared the transmission case 18 that houses the transmission mechanism 14 but is not yet mounted with the oil pan 20, the pressure adjusting unit 32 that houses the solenoid valves 42 and the pressure sensor 43 in the body 44, and the first connector 36 that houses the control circuit unit 80 in the connector body 50 closed by the external cap 54. Next, the pressure adjusting unit 32 is combined with the transmission case 18 and the internal cable 34 connected to the pressure adjusting unit 32 is mounted between the internal exposed portion 64 of the connector body 50 and the internal cap 52 to electrically connect the solenoid valves 42 and the pressure sensor 43 to the control circuit unit 80. Next, a cable connector of a test unit (not shown) is mounted on the mounting portion 74 of the external exposed portion 66 of the connector body 50 to electrically connect the test unit to the control circuit unit 80, and then a control signal is sent from the test unit to the control circuit unit 80 to thereby operate the solenoid valve 42. At this time, working oil is supplied to the pressure adjusting unit 32 from an oil pump provided in the test unit and hydraulic pressure according to the operation of the solenoid valve 42 is supplied to the moving elements 31 of the transmission mechanism 14. The transmission mechanism 14 is driven by this supplied hydraulic pressure and hence speed change characteristics can be tested and adjusted by changing, as appropriate, the control signal sent from the test unit to the control circuit unit 80. As a result, when the speed change characteristics become desired speed change characteristics, the cable connector of the test unit is removed from the connector body 50 to finish the operation test process.

Figure 4:
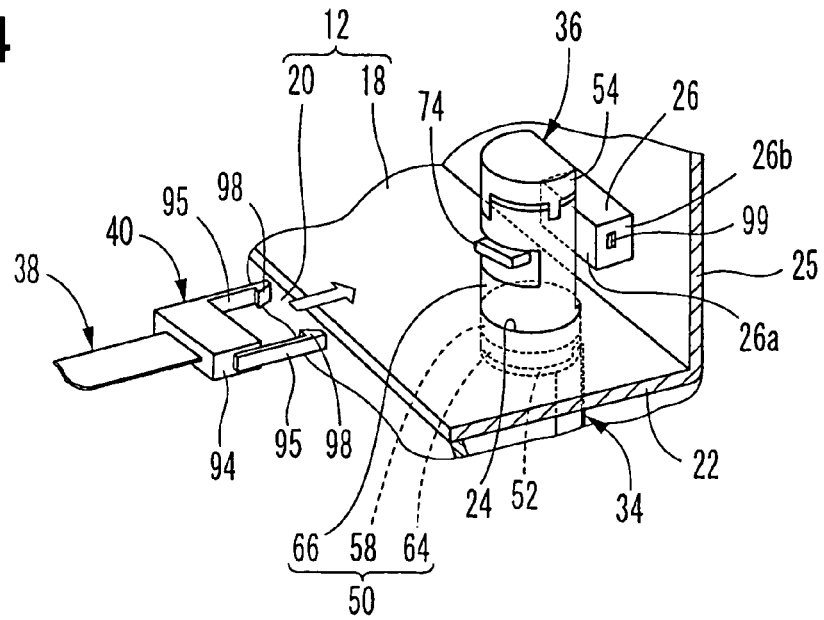
FIG. 4 is a schematic view for showing the final assembly process of the automatic transmission in accordance with the first embodiment.

After the above-described operation test process, the final assembly process is carried out. Specifically, first, the first connector 36 is passed through the through hole 24 of the transmission case 18 from the external cap 54 side as the internal cable 34 is mounted between the connector body 50 and the internal cap 52. With this passing the first connector 36, the housing portion 58 of the connector body 50 is housed in the through hole 24, and then the oil pan 20 is combined with the transmission case 18 to thereby form the housing 12 that houses the pressure adjusting unit 32, the internal cable 34, and the like. Thereafter, the second connector 40 integrated with the external cable 38 is mounted, by the use of engagement, on the external exposed portion 66 of the connector body 50 and the heat radiating portion 26 of the transmission case 18. At this time, as to the second connector 40, as shown in FIG. 4, by causing the external exposed portion 66 to enter between the respective arm portions 95, the main portion 94 is mounted on the mounting portion 74 of the external exposed portion 66 from the opposite side of the heat radiating portion 26 and at the same time the respective arm portions 95 are mounted on the heat radiating portion 26 from the external exposed portion 66 side. With this, the external exposed portion 66 is fixed to the transmission case 18 in such a way as to be sandwiched between the second connector 40 and the heat radiating portion 26, and the heat conducting part 70 of the external exposed portion 66 is pressed onto the heat radiating portion 26. In this manner, the automatic transmission 10 is completed.

In this manner, according to the first embodiment, the heat conducting part 70 in contact with the control circuit unit 80 in the connector body 50 in the first connector 36 is pressed onto the heat radiating portion 26 of the transmission case 18. Hence, heat generated in the control circuit unit 80 is conducted to the heat radiating portion 26 outside the connector body 50 and is dissipated. Here, since the heat conducting part 70 is in surface contact with both of the control circuit unit 80 and the heat radiating portion 26, heat conduction is accelerated from the control circuit unit 80 to the heat conducting part 70 and to the heat radiating portion 26. Moreover, since the control circuit unit 80 is pressed onto the heat conducting part 70 by the restoring force of the urging part 82, heat conduction from the control circuit unit 80 to the heat conducting part 70 is accelerated. Furthermore, since the first connector 36 is fixed to the transmission case 18 in such a way as to be sandwiched between the second connector 40 and the heat radiating portion 26, an abutting state where the heat conducting part 70 abuts against the heat radiating portion 26 is held and hence heat conduction from the heat conducting part 70 to the heat radiating portion 26 is accelerated. In addition, since the direction in which the first connector 36 is sandwiched between the second connector 40 and the heat radiating portion 26 is nearly orthogonal to the axis of the through hole 24, the first connector 36 is prevented from being swung around the contact point of the through hole 24 and the housing portion 58 to make it difficult for the heat conducting part 70 to be removed from the heat radiating portion 26. In this manner, the heat of the control circuit unit 80 covered with the connector body 50 can be sufficiently released to the outside and hence the malfunction and by extension the transmission error of the control circuit unit 80 can be prevented.

In addition, according to the first embodiment, the second connector 40 electrically connected to the engine control unit 92 is mounted, by the use of engagement, on the first connector 36 and the heat radiating portion 26, whereby the second connector 40 can be electrically connected to the control circuit unit 80 and the heat conducting part 70 can be pressed onto the heat radiating portion 26. That is, it can be said that the second connector 40 that electrically connects the engine control unit 92 to the control circuit unit 80 also has the function of pressing the first connector 36 onto the heat radiating portion 26 and further, as described above, the function of fixing the first connector 36 to the transmission case 18. By causing one component to have a plurality of functions, it is possible to reduce the number of components and hence to reduce costs.

As described above, in the first embodiment, the solenoid valve 42 and the pressure sensor 43 correspond to "electric components of the pressure adjusting unit," respectively, and the engine control unit 92 corresponds to "an electric component outside the housing." Moreover, the connector body 50 corresponds to "a covering part" and the heat conducting part 70 corresponds to "a heat conducting part" and the external wall surface 70a of the heat conducting part 70 and the protruding end surface 26a of the heat radiating portion 26 correspond to "mutual contact surfaces of the heat conducting part and heat radiating portion."

Second Embodiment

Figure 5:
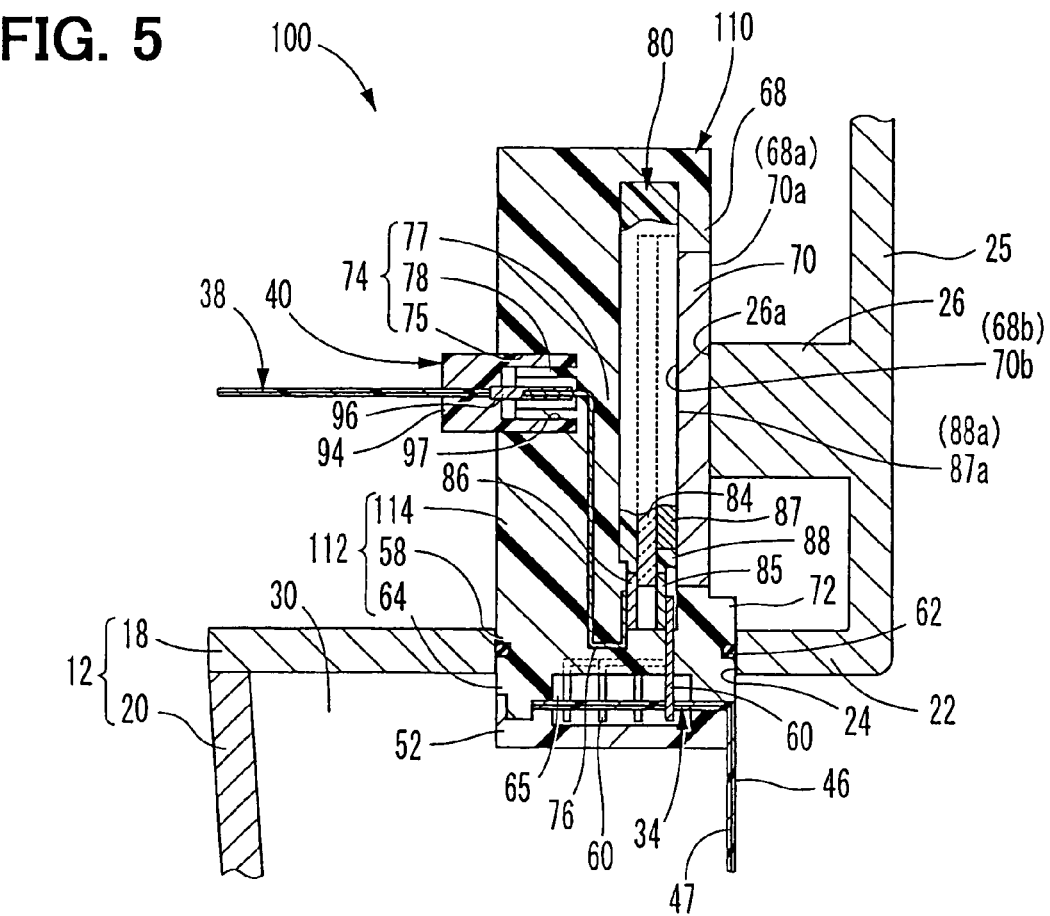
FIG. 5 is a sectional view showing the main portion of an automatic transmission in accordance with the second embodiment.

As shown in FIG. 5, the second embodiment of the present invention is a modification of the first embodiment and the substantially same constituent parts as those in the first embodiment will be denoted by the same reference symbols and their descriptions will be omitted.

In an automatic transmission 100 of the second embodiment, an external exposed portion 114 of a connector body 112 of a first connector 110 is formed in a nearly cylindrical shape. Then, in this external exposed portion 114 are embedded the heat conducting part 70, the terminals 60, 76, and the control circuit unit 80. According to the second embodiment like this, the first connector 110 in which the control circuit unit 80 is covered with the connector body 112 can be easily molded by insertion molding and hence the effect of reducing cost can be enhanced. Moreover, the external cap 54 and the gasket 56 in the first embodiment are not required to be provided, which results in also enhancing the effect of reducing cost. Furthermore, the heat radiating plate 87 of the control circuit unit 80 is always in close contact with the heat conducting part 70 without using the urging part 82 in the first embodiment, which results in also enhancing the effect of reducing cost and at the same time enhancing the effect of dissipating heat from the control circuit unit 80.

In the second embodiment, the connector body 112 corresponds to "covering part."

Third Embodiment

Figure 6:
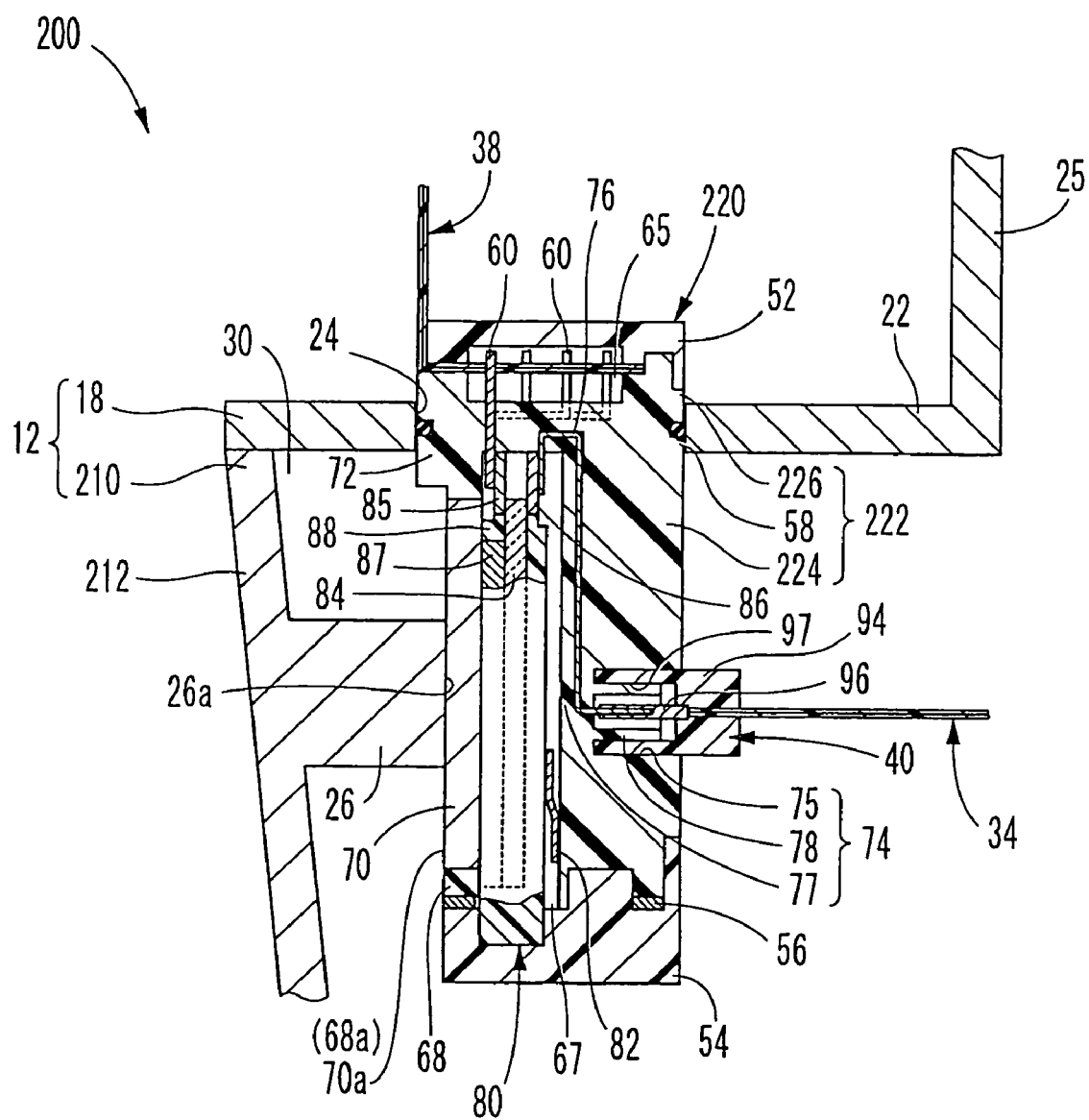
FIG. 6 is a sectional view showing the main portion of an automatic transmission in accordance with the third embodiment.

As shown in FIG. 6, the third embodiment of the present invention is a modification of the first embodiment and the substantially same constituent parts as those in the first embodiment will be denoted by the same reference symbols and their descriptions will be omitted.

In an automatic transmission 200 according to the third embodiment, the heat radiating portion 26 is integrally molded with a side wall portion 212 provided around the through hole 24 in an oil pan 210. A connector body 222 of a first connector 220 is arranged in a manner in which the connector body 50 of the first embodiment is in an inverted position. That is, a portion 224 corresponding to the external exposed portion 66 of the first embodiment in the connector body 222 forms an internal exposed portion exposed to the inside the housing 12, and the second connector 40 fixed to the end portion opposite to the pressure adjusting unit 32 of the internal cable 34 is removably mounted on the internal exposed portion 224. With this, the control circuit unit 80 in the connector body 222 is electrically connected to the solenoid valve 42 and the pressure sensor 43 of the pressure adjusting unit 32 through the second connector 40 and the internal cable 34. Moreover, a portion 226 corresponding to the internal exposed portion 64 of the first embodiment in the connector body 222 forms an external exposed portion exposed to the outside of the housing 12 and an end portion on the opposite side of the engine control unit 92 of the external cable 38 is removably mounted between the external exposed portion 226 and the internal cap 52. With this, the control circuit unit 80 in the connector body 222 is electrically connected to the engine control unit 92 through the external cable 38.

In the operation test process of this automatic transmission 200, before the solenoid valve 42 is operated, the second connector 40 integrated with the internal cable 34 is mounted, by the use of engagement, only on the internal exposed portion 224 in the connector body 222 to electrically connect the solenoid valve 42 and the pressure sensor 43 to the control circuit unit 80. At this time, as to the second connector 40, its main portion 94 is mounted on the mounting portion 74 of the internal exposed portion 224 by causing the internal exposed portion 224 to enter between the respective arm portions 95.

Moreover, in the final assembly process of the automatic transmission 200, first, the second connector 40 is mounted, by the use of engagement, on the heat radiating portion 26 of the oil pan 210 with the second connector 40 mounted in the internal exposed portion 224 of the connector body 222. At this time, by mounting the respective arm portions 95 of the second connector 40 on the heat radiating portion 26 from the internal exposed portion 224 side, the internal exposed portion 224 is fixed to the oil pan 210 in such a way as to be sandwiched between the second connector 40 and the heat radiating portion 26. Thereafter, the oil pan 210 is combined with the transmission case 18 in such a way that the first connector 220 passes through the through hole 24 with the second connector 40 mounted on the internal exposed portion 224 and the heat radiating portion 26. With this, the housing 12 is formed and then the external cable 38 is mounted between the external exposed portion 226 of the connector body 222 and the internal cap 52 to thereby complete the automatic transmission 200.

According to the third embodiment like this, the internal exposed portion 224 of the connector body 222 is sandwiched between and fixed to the second connector 40 and the heat radiating portion 26, so that the heat conducting part 70 is pressed onto the heat radiating portion 26. Therefore, as is the case with the first embodiment, a transmission error is prevented.

In addition, according to the third embodiment, the second connector 40 electrically connected to the solenoid valve 42 and the pressure sensor 43 is mounted, by the use of engagement, on the first connector 36 and the heat radiating portion 26, so that the second connector 40 can be electrically connected to the control circuit unit 80 and the heat conducting part 70 can be pressed onto the heat radiating portion 26. Therefore, as is the case with the first embodiment, it is possible to provide one component with a plurality of functions and hence to reduce costs.

In the third embodiment, the connector cover 222 corresponds to "a covering part."

In the above-described first to third embodiments, the through hole 24 is formed in the transmission case 18 but the through hole 24 may be formed in the oil pans 20, 210. In this case, the heat radiating portion 26 is formed in the transmission case 18 or in the oil pans 20, 210 according to the position of the through hole 24.

Moreover, in the above-described first to third embodiments, the external wall surface 70a of the heat conducting part 70 and the protruding end surface 26a of the heat radiating portion 26 are formed in a flat shape and are put into surface contact with each other, but it is also recommended that these surfaces 70a, 26a be formed in curved surfaces that complement each other and be put into surface contact with each other.

Moreover, in the above-described first to third embodiments, the second connector 40 and/or the control circuit unit 80 are/is electrically connected to the engine control unit 92 arranged outside the housing 12 through the external cable 38. In contrast to this, it is also recommended that the second connector 40 and/or the control circuit unit 80 be electrically connected to an electric component that is arranged outside the housing 12 and is different from the engine control unit 92 through the external cable 38.

Furthermore, in the third embodiment, the control circuit unit 80 may be embedded in the internal exposed portion 224 as is the case with the above-described second embodiment.

What is claimed is:

1. An automatic transmission comprising:
   a pressure adjusting unit that controls hydraulic pressure supplied to a transmission mechanism by an operation of an electric component;
   a housing that has a heat radiating portion for radiating heat to the outside and houses the pressure adjusting unit;
   a first connector that is so arranged as to pass through the housing and has a control circuit unit electrically connected to the electric component of the pressure adjusting unit; and
   a second connector that is electrically connected to an electric component outside the housing and is engaged with the first connector and the heat radiating portion to be electrically connected to the control circuit unit and to press the first connector onto the heat radiating portion, wherein
   the second connector has a main portion and first and second arm portions extending from the main portion to respective free ends, each of said free ends having an engaging claw, the heat radiating portion has first and second depressed portions, and the respective engaging claws are engaged with the depressed portions whereby the second connector is retained by the heat radiating portion to sandwich the first connector between itself and the heat radiating portion.

2. The automatic transmission according to claim 1, wherein the second connector is mounted on the first connector from an opposite side of the heat radiating portion and is mounted on the heat radiating portion from the first connector side.

3. The automatic transmission according to claim 1, wherein the first connector is fitted in a through hole passing through the housing, and wherein the second connector and the heat radiating portion sandwich the first connector in a direction orthogonal to an axis of the through hole.

4. The automatic transmission according to claim 1, wherein the first connector has a covering part for covering the control circuit unit and a heat conducting part made from a metal material that is embedded in the covering part and is in contact with the control circuit unit and the heat radiating portion.

5. The automatic transmission according to claim 4, wherein the heat conducting part is in surface contact with the heat radiating portion.

6. The automatic transmission according to claim 5, wherein mutual contact surfaces of the heat conducting part and the heat radiating portion are formed in flat surfaces.

7. The automatic transmission according to claim 4, wherein the covering part is formed in a hollow shape and houses the control circuit unit.

8. The automatic transmission according to claim 7, wherein the first connector has an urging part that is housed in the covering part and urges the control circuit unit to the heat conducting part.

9. The automatic transmission according to claim 4, wherein the control circuit unit and the heat conducting part are embedded in the covering part.

* * * * *